April 24, 1956    J. R. BARDSLEY    2,743,308
HOUSING FOR ELECTRICAL APPARATUS
AND METHOD OF MANUFACTURE
Filed Dec. 19, 1950
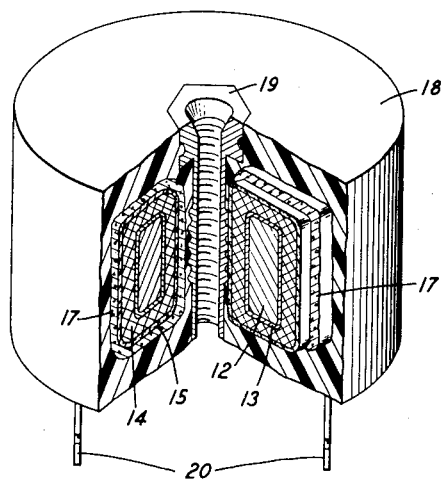
INVENTOR
J. R. BARDSLEY
BY
ATTORNEY

United States Patent Office 2,743,308
Patented Apr. 24, 1956

2,743,308
HOUSING FOR ELECTRICAL APPARATUS AND METHOD OF MANUFACTURE

Joseph R. Bardsley, Yonkers, N. Y., assignor to Bell Telephone Laboratories, Incorporated, New York, N. Y., a corporation of New York Application December 19, 1950, Serial No. 201,577

6 Claims. (Cl. 174—52)

This invention relates to incapsulated electrical apparatus and to methods of manufacture of such apparatus.

In the manufacture of incapsulated electrical apparatus, it has been found that changes occur in the electrical characteristics during the incapsulating step, which are not accurately predictable. These changes have been attributed to a large extent to the shifting of the relative positions of the elements of the units occasioned by internal pressure developed within the enclosing capsule during curing. In the case of inductances, changes also occur where the dielectric between the turns of the windings is altered by the forcing of some of the covering material into the interstices of the windings. The development of internal pressure in completed components is also one of the causes of changes in electrical characteristics at different operating temperatures.

An object of this invention is to improve incapsulated electrical components and more particularly to reduce the changes in electrical characteristics of such components caused by the development of internal pressures.

Another object of this invention is to make possible the use of incapsulating materials which have desirable characteristics as outer protective coatings but which are detrimental to electrical components if applied directly.

One feature of this invention resides in providing a cushioning layer on a component prior to applying an incapsulating outer layer. This cushioning layer permits the shrinkage of the capsule during curing and the expansion of the component, or the contraction of the capsule due to thermal effects without the generation of internal pressures of sufficient magnitude to cause any appreciable change in the electrical characteristics of the component.

Another feature of this invention resides in applying a sealing layer to the component prior to the application of the cushioning layer to prevent the flowing of any material into the interstices of the component whereby the characteristics of its dielectric might be altered.

The invention and the above and other objects and features may be more clearly understood from the accompanying drawing showing in perspective an inductor constructed in accordance with this invention with portions broken away to illustrate the relationship of the various elements.

In the drawing, the inductor includes a core 12 of a material such as a compressed mass of finely divided ferromagnetic particles, such as Permalloy, covered with an insulating sheathing 13 of enamel to maintain the mass and insure insulation of the turns of the winding 14 therefrom. A sealing layer 15 in the form of a tough skin covers the windings 14 to prevent the entrance of foreign material into the interstices of the windings thereby to alter the dielectric and the over-all characteristics of the unit. Cushioning means in the form of a compressible layer 17 is provided over the sealing layer to protect the encased unit from the detrimental effects of internal pressure developed between the unit and its enclosing capsule 18. This cushioning means may be either a layer of resilient material or of a fluid material which distributes any localized pressure over the entire sealing layer 15 to reduce its detrimental effects. The incapsulated unit is provided with an internally threaded metallic insert 19 for mounting and has terminals 20 projecting through the capsule walls.

Units of the above type are enclosed by first dipping, smearing, painting or otherwise coating them with a layer of some material which will bridge small openings and will form a tough, continuous skin 15 over their outer surface. It is preferable also, from the standpoint of manufacturing expedience, that the material be of a fast drying type. One material having these characteristics is a phenol formaldehyde resin dissolved in amyl acetate known commercially as "Amberoid Cement" and obtained from the Amberoid Corporation of Boston, Mass. This material is cured in air.

The cushioning coating 17 is applied over the sealing layer 15 after the latter has been cured. The method of application employed depends largely on the material of this coating. Where a fluid layer is desired to effect cushioning by a pressure distribution, silicone greases have been found satisfactory particularly Dow Corning No. 4 or No. 11 silicone grease. This material can be applied by a painting or smearing operation and advantageously in a layer of uniform thickness about 1/32 inch thick. These silicone greases are somewhat compressible; hence, in addition to distributing the pressure they also tend to absorb some of it. Layers of resilient material, on the other hand, usually are applied by a dipping or coating procedure.

One example of a resilient material is "Thiokol" supplied by Thiokol Corporation of Trenton, N. J., which is a synthetic rubber derived from dehydrogenated organic compounds and inorganic polysulphides or combinations thereof. This material is available in the form of a viscous liquid which forms a coating about 1/16 inch thick on dipped bodies which are drained for a short period. While the coating requires heat to be cured it has been found advantageous to cure it simultaneously with the curing of the outer capsule, thus effecting a reduction in the handling required.

The encasing of the unit is completed by incapsulating it with a tough outer jacket 18. The jacket material preferably should be hard, impervious to moisture and the atmosphere, and be readily handled. A material which is fluid, can be cast in an open mold and can be rapidly cured is also desirable. "Stypol 507" obtainable from the H. H. Robertson Company of Pittsburgh, Pa., is one example of a satisfactory material having the above characteristics. It is a talc loaded styrene polyester casting resin which is liquid in form and is readily cured when about two per cent by weight of a peroxide is added. This curing, which is an exothermic reaction, can be accelerated by the application of external heat. The resin is generally mixed with either a liquid or powder peroxide catalyst, for example, "Lupersol DDM" or cyclohexanone peroxide both of which are obtained from the Lucidol Division of Novadel-Agene Corporation of Buffalo, N. Y. The casting may be done in an open topped mold into which the mixture is poured after the mold surfaces have been suitably lubricated, as with a silicone grease, and the unit to be incapsulated has been properly positioned as by suspending it by its terminals 20. The exemplary material gels sufficiently for handling in about one-half hour. After the material has gelled the unit may be removed from the mold and placed in an oven and baked for about two hours at approximately 250° F. Alternatively, the unit can be cured in the mold either by placing it in an oven or otherwise heating it.

It is to be understood that the materials, and the handling and curing thereof set forth above are merely exemplary and are not to be interpreted as restricting the invention thereto. Other combinations and treatments of materials may be devised by those skilled in the art without departing from the spirit and scope of the invention which is applicable to a variety of electrical components including various forms of inductors, capacitors and resistors.

What is claimed is:

1. An inclosure for electrical apparatus having small openings in its surface comprising a one-piece outer capsule, a compressible rubber-like layer within said capsule, around the apparatus, and capable of penetrating into said small openings in the surface of said apparatus, and a resinous sealing skin over said apparatus and between said apparatus and said compressible rubber-like layer, said sealing skin being impermeable to the surrounding rubber-like layer and not appreciably penetrating said small openings in said apparatus.

2. An inclosure for electrical apparatus having small openings in its surface comprising a one-piece outer capsule, a compressible layer capable of flowing into the small openings in the surface of the apparatus within said capsule and around said apparatus, and a resinous sealing skin encompassing said apparatus and between said apparatus and said compressible layer, said sealing skin being impermeable to said compressible layer and not penetrating appreciably said small openings in said apparatus.

3. An inclosure for electrical apparatus comprising a one-piece outer capsule, a resinous sealing skin over the apparatus impermeable to the surrounding material, and a compressible fluid intermediate said skin and said capsule.

4. An inclosure for electrical apparatus comprising a one-piece, styrene polyester resin outer capsule, a resinous sealing skin over the apparatus impermeable to the surrounding material, and a layer of silicone grease intermediate said skin and said capsule.

5. The method of manufacturing an inclosure for electrical apparatus which comprises first applying a resinous sealing skin over the apparatus to form a protective layer which is impermeable to subsequently applied materials, then coating said apparatus with a liquid layer which solidifies and becomes rubber-like and compressible on curing, curing said liquid layer, and incapsulating the coated apparatus.

6. The method of manufacturing an inclosure for electrical apparatus which comprises first dipping the apparatus in a lacquer-like material to form a skin impermeable to subsequently applied materials thereover, drying said skin, coating the apparatus with a layer of viscous fluid which becomes rubber-like and compressible on curing, then casting a one-piece capsule over the apparatus and heating the apparatus to cure the rubber-like layer and the capsule.

References Cited in the file of this patent

UNITED STATES PATENTS

| | | |
|---|---|---|
| 1,497,449 | Kempton | June 10, 1924 |
| 1,982,319 | Perry | Nov. 27, 1934 |
| 2,036,068 | Montsinger | Mar. 31, 1936 |
| 2,136,609 | Butterfield et al. | Nov. 15, 1938 |
| 2,183,256 | Gabler | Dec. 12, 1939 |
| 2,222,729 | Ver Planck et al. | Nov. 26, 1940 |
| 2,414,320 | Miller et al. | Jan. 14, 1947 |
| 2,414,525 | Hill et al. | Jan. 21, 1947 |
| 2,444,880 | Robinson | July 6, 1948 |
| 2,445,196 | West | July 13, 1948 |
| 2,517,888 | Krenik | Aug. 8, 1950 |
| 2,597,338 | Kohring | May 20, 1952 |